United States Patent [19]

Makishima et al.

[11] Patent Number: 4,530,909

[45] Date of Patent: Jul. 23, 1985

[54] ALUMINOSILICATE GLASS CONTAINING $Y_2O_3$ CONCENTRATE AND $ZRO_2$

[75] Inventors: Akio Makishima, Sakura; Tatsuya Nagata, Tokoname; Takajiro Shimohira, Ryugasaki, all of Japan

[73] Assignee: National Institute for Researches in Inorganic Materials, Ibaraki, Japan

[21] Appl. No.: 662,832

[22] Filed: Oct. 19, 1984

Related U.S. Application Data

[63] Continuation of Ser. No. 532,976, Sep. 16, 1983, abandoned.

[30] Foreign Application Priority Data

Oct. 14, 1982 [JP] Japan .................................. 57-180498

[51] Int. Cl.³ .............................................. C03C 3/04
[52] U.S. Cl. ........................................ 501/73; 106/97; 501/64
[58] Field of Search ............................ 501/31, 64, 73

[56] References Cited

U.S. PATENT DOCUMENTS 3,573,078  3/1971  Bacon ..................................... 501/38
3,804,646  4/1974  Dumbaugh ............................ 501/64
3,957,500  5/1976  Pitts ...................................... 501/103
4,088,023  5/1978  Berleue et al. ....................... 501/73

FOREIGN PATENT DOCUMENTS 53-137218  11/1978  Japan .................................... 501/73
58-2234     1/1983  Japan .................................... 501/73

OTHER PUBLICATIONS

Makishima, A. et al., J. of Non–Crystalline Solids, 38 and 39, (1980), pp. 661–666.
Makishima, A. et al., J. of American Ceramic Society, vol. 61, No. 5–6, May–Jun. 1978, pp. 247–249.

*Primary Examiner*—Helen M. McCarthy
*Attorney, Agent, or Firm*—Oblon, Fisher, Spivak, McClelland & Maier

[57] ABSTRACT

A process for preparing aluminosilicate glass comprising from 30 to 60 molar % of $SiO_2$, from 20 to 35 molar % of $Al_2O_3$ and from 10 to 30 molar % of a total of rare earth oxides composed mainly of $Y_2O_3$, wherein an yttrium concentrate is used as the rare earth oxides composed mainly of $Y_2O_3$, and $ZrO_2$ not in excess of 8 molar % to improve alkali resistance.

2 Claims, No Drawings

ALUMINOSILICATE GLASS CONTAINING $Y_2O_3$ CONCENTRATE AND $ZRO_2$

This is a continuation of application Ser. No. 532,976, filed Sept. 16, 1983, now abandoned.

BACKGROUND OF THE INVENTION

1. Field of the Invention

The present invention relates to a process for producing aluminosilicate glass containing rare earth oxides, particularly yttrium oxide.

2. Description of the Prior Art

Aluminosilicate glass composed of silica and alumina has high heat resistance and good mechanical properties, and it is also superior in the corrosion resistance and weather-resistance. However, a very high temperature is required for the preparation of the glass of this type.

It was impossible to produce the glass of this type by a melting method by means of a usual electric furnace, since the usual electric furnace employing a silicon carbide heating element is restricted to a temperature of up to about 1550° C.

In general, when an alkali metal oxide or an alkaline earth metal oxide is incorporated, the melting point decreases and it becomes possible to produce glass by means of a usual electric furnace equipped with a silicon carbide heating element. However, when an alkali metal oxide or an alkaline earth metal oxide is incorporated, there is a serious problem that various properties such as heat resistance, mechanical properties, chemical resistance, corrosion resistance and weather-resistance tend to be deteriorated.

The present inventors have previously reported that when $Y_2O_3$ is incorporated, glass can be prepared by means of a usual electric furnace at a temperature of about 1550° C. and the glass thereby obtained has excellent mechanical properties. However, isolated $Y_2O_3$ is very expensive, and accordingly adds to the costs.

SUMMARY OF THE INVENTION

The present inventors have conducted researches with an aim to utilize an yttrium concentrate i.e. an intermediate purification product for the preparation of $Y_2O_3$, and found that the yttrium concentrate obtained by purifying a crude ore of $Y_2O_3$ such as xenotime comprises a few 10% by weight of $Y_2O_3$ and the rest being rare earth oxides such as $Dy_2O_3$, $Nd_2O_3$, $CeO_2$, $HO_2O_3$, $Yb_2O_3$, $Sm_2O_3$, $La_2O_3$, $Gd_2O_3$ and $Er_2O_3$, and that when aluminosilicate glass is prepared by using such an yttrium concentrate instead of $Y_2O_3$, (1) the impurities other than $Y_2O_3$ do not adversely affect the properties, particularly alkali resistance, of the aluminosilicate glass, and (2) by the use of the yttrium concentrate, the melting point of the glass can be lowered by about 50° C. as compared with the case where isolated $Y_2O_3$ is used, and yet the cost of the yttrium concentrate is about 1/5 of the cost of the isolated $Y_2O_3$, whereby the cost of the product can be considerably reduced. The present invention has been accomplished based on these discoveries.

Thus, the present invention provides a process for producing aluminosilicate glass comprising from 30 to 60 molar % of $SiO_2$, from 20 to 35 molar % of $Al_2O_3$ and from 10 to 30 molar % of a total of rare earth oxides composed mainly of $Y_2O_3$, wherein an yttrium concentrate is used as the rare earth oxides composed mainly of $Y_2O_3$.

DETAILED DESCRIPTION OF THE PREFERRED EMBODIMENTS

Now, the present invention will be described in detail with reference to the preferred embodiments.

In the present invention, the aluminosilicate glass has a composition comprising from 30 to 60 molar % of $SiO_2$, from 20 to 35 molar % of $Al_2O_3$ and from 10 to 30 molar % of a total of rare earth oxides composed mainly of $Y_2O_3$.

If $SiO_2$ is less than 30 molar %, the melting point tends to be too high and it becomes difficult to melt the glass at 1550° C. On the other hand, if the amount exceeds 60 molar %, it becomes difficult to obtain the desired properties of the aluminosilicate glass containing rare earth elements.

If $Al_2O_3$ is less than 20 molar %, no adequate vitrification is attained, and if the amount exceeds 35 molar %, the melting point tends to be too high and it becomes difficult to obtain glass at 1550° C.

If the total of rare earth oxides composed mainly of $Y_2O_3$ based on the yttrium concentrate as the starting material is less than 10 molar %, no adequate desired properties for the rare earth oxides-containing glass are obtainable and it becomes difficult to melt the glass at a temperature of 1550° C. On the other hand, if the amount exceeds 30 molar %, crystallization will take place, whereby glass is not obtainable.

The yttrium concentrate referred to in the present invention is an intermediate purification product obtainable by sulfuric acid treatment or alkali fusion of a crude ore of $Y_2O_3$ such as xenotime. For example, the alkali fusion is conducted by gradually adding xenotime to molten sodium hydroxide at 400° C. The reaction is an exothermic reaction. After the completion of the reaction, the reaction mixture is cooled, and the reaction products are extracted with water, whereby sodium phosphate and excess alkali are removed. The rare earth hydroxides thereby obtained are then dissolved in a small amount of hydrochloric acid. To this solution, oxalic acid is added to convert the rare earth hydroxides to rare earth oxalates, which are then burned at a temperature of 900° C. to obtain an yttrium concentrate. An example of the analytical results of the yttrium concentrate thereby obtained is as follows.

| An example of the analytical results of a yttrium concentrate (% by weight) | | | |
|---|---|---|---|
| Rare earth oxides | | | |
| | | Rare earth oxides | |
| $Y_2O_3$ | 62.9% | $Sm_2O_3$ | 1.4 |
| $CeO_2$ | 3.14 | $Nd_2O_3$ | 4.3 |
| $La_2O_3$ | 2.23 | $Pr_2O_3$ | 0.88 |
| $Eu_2O_3$ | 0.02 | $ThO_2$ | <0.2 |
| $Gd_2O_3$ | 2.7 | Rare earth components | 98.0% |
| $Dy_2O_3$ | 11.3 | IgLoss | 0.2 |
| $Er_2O_3$ | 1.43 | CaO | <0.2 |
| $Ho_2O_3$ | 3.8 | $SO_3$ | <0.5 |
| $Yb_2O_3$ | 5.0 | $P_2O_5$ | <0.1 |

Namely, the yttrium concentrate contains the constituent elements of the ore without separating them by the purification operation.

In addition to the above-mentioned glass composition, $TiO_2$ and $ZrO_2$ may be incorporated in amounts of not more than 18 molar % and not more than 8 molar %, respectively as the case requires. The addition of $TiO_2$ serves to improve the chemical resistance, corrosion resistance and weather resistance. However, if the amount exceeds 18 molar %, crystallization tends to take place, whereby glass is not obtainable. The addition of $ZrO_2$ serves to improve the chemical resistance, corrosion resistance, weather resistance, mechanical properties and heat resistance. However, if the amount exceeds 8 molar %, crystallization tends to take place, whereby glass is not obtainable.

According to the process of the present invention, aluminosilicates containing $Y_2O_3$ are obtainable at low costs, and they have a low melting point and can be melted by a usual electric furnace. Further, the glass thereby obtained has excellent properties of the aluminosilicate glass. The glass thereby obtained has a high resiliency and high alkali resistance, and it is useful in combination with cement.

Now, the present invention will be described in further detail with reference to Example 1.

EXAMPLE 1

A mixture comprising 45 molar %, 23.5 weight percent, of acid-washed refined silica for optical use, 25 molar %, 21.9 weight percent, of $Al_2O_3$, an yttrium concentrate containing a total of 25 molar %, 49.2 weight percent, of rare earth oxides and 5 molar %, 5.4 weight percent, of $ZrO_2$, was placed in a platinum crucible, and melted in an electric furnace at about 1550° C. for 3 hours. The melt thereby obtained was poured onto an aluminum plate and left to cool, whereby slightly brown transparent foamless glass was obtained.

When maintained in an aqueous solution of 2N NaOH at 95° C. for 10 days in accordance with the powder method (JIS 25-35 mesh), the product showed a weight reduction of 5.0% by weight.

What is claimed is:

1. An aluminosilicate glass consisting of 30 to 60 molar % of $SiO_2$, 20 to 35 molar % of $Al_2O_3$, 10 to 30 molar % of an yttrium concentrate composed essentially of $Y_2O_3$ and the rare earth oxides present in a crude ore of $Y_2O_3$, the concentrate being composed mainly of $Y_2O_3$, and 5-8 molar % of $ZrO_2$.

2. An aluminosilicate glass consisting of 30 to 60 molar % of $SiO_2$, 30 to 35 molar % of $Al_2O_3$, 10 to 30 molar % of an yttrium concentrate composed essentially of $Y_2O_3$ and the rare earth oxides present in a crude ore of $Y_2O_3$, the concentrate being composed mainly of $Y_2O_3$ and an effective amount, not to exceed 8 molar %, of $ZrO_2$ for improving the chemical resistance of the glass in powder form, over a same glass absent $ZrO_2$, when maintained in an aqueous solution of 2N NaOH at 95° C. for a period of 10 days.

* * * * *